(12) United States Patent
Treier et al.

(10) Patent No.: US 8,673,196 B2
(45) Date of Patent: Mar. 18, 2014

(54) RADIAL SEAL FILTER WITH OPEN END PLEATS

(75) Inventors: Phil P. Treier, Bloomdale, OH (US); Shivaram Manjunathaiah, Canton, MI (US); Allan B. Morris, Shakespeare (CA)

(73) Assignee: Fram Group IP LLC, Lake Forest, IL (US)

( * ) Notice: Subject to any disclaimer, the term of this patent is extended or adjusted under 35 U.S.C. 154(b) by 850 days.

(21) Appl. No.: 12/039,441

(22) Filed: Feb. 28, 2008

(65) Prior Publication Data

US 2008/0209875 A1    Sep. 4, 2008

Related U.S. Application Data

(60) Provisional application No. 60/892,210, filed on Feb. 28, 2007.

(51) Int. Cl.
*B29C 45/14* (2006.01)
*B01D 46/00* (2006.01)

(52) U.S. Cl.
USPC .............. 264/254; 55/498; 55/502; 55/510; 210/493.2; 264/250; 264/257

(58) Field of Classification Search
USPC ....... 55/498, 502, 510, 503, DIG. 5; 264/241, 264/250, 254, 257; 210/493.2, 497.01
See application file for complete search history.

(56) References Cited

U.S. PATENT DOCUMENTS

| | | |
|---|---|---|
| 5,415,677 A | 5/1995 | Ager et al. |
| 5,484,466 A | 1/1996 | Brown et al. |
| 5,556,440 A | 9/1996 | Mullins et al. |
| 5,733,351 A * | 3/1998 | Hult et al. ........................ 55/486 |
| D400,323 S * | 10/1998 | Scanlon et al. ................ D32/30 |
| 6,149,700 A | 11/2000 | Morgan et al. |
| 6,152,979 A * | 11/2000 | Cappuyns .................... 55/385.3 |

(Continued)

OTHER PUBLICATIONS

International Search Report Dated Jul. 28, 2008, International Application No. PCT/US2008/055288.

(Continued)

*Primary Examiner* — Robert Clemente
(74) *Attorney, Agent, or Firm* — Erin J. Fox; Barnes & Thornburg LLP

(57) ABSTRACT

A filter, comprising: a filter element comprising pleated filter media having a plurality of pleats configured into a closed loop of filter media, the filter element having an outer perimeter defined by a plurality of outer pleat tips, and an inner perimeter defined by a plurality of inner pleat tips, the plurality of inner pleat tips defining an inner chamber extending through the filter element; a cap disposed on a first end of the filter element the cap being configured to seal a first opening of the first end of the filter; a first plurality of open end pleats positioned between an edge of the cap and the outer perimeter of the filter element, the first plurality of open end pleats defining a first fluid path through the filter media into the inner chamber; a sealing ring disposed on a second end of the filter element the sealing ring being configured to provide an inlet opening providing fluid communication to the inner chamber; and a second plurality of open end pleats positioned between an edge of the sealing ring and the outer perimeter of the filter element, the second plurality of open end pleats defining a second fluid path through the filter media into the inner chamber.

16 Claims, 16 Drawing Sheets

(56) References Cited

U.S. PATENT DOCUMENTS

| | | | |
|---|---|---|---|
| 6,306,193 B1 * | 10/2001 | Morgan et al. | 55/498 |
| 6,416,561 B1 | 7/2002 | Kallsen et al. | |
| 6,447,567 B1 | 9/2002 | Ehrenberg | |
| 6,511,599 B2 * | 1/2003 | Jaroszczyk et al. | 210/493.5 |
| D475,129 S | 5/2003 | Ward et al. | |
| 6,641,637 B2 | 11/2003 | Kallsen et al. | |
| 6,652,614 B2 * | 11/2003 | Gieseke et al. | 55/498 |
| 6,902,598 B2 | 6/2005 | Gunderson et al. | |
| 7,323,106 B2 | 1/2008 | Jaroszczyk et al. | |
| 7,374,594 B2 * | 5/2008 | Gierer | 55/467 |
| D601,318 S * | 9/2009 | Williams et al. | D32/30 |
| D601,319 S * | 9/2009 | Williams et al. | D32/30 |
| 2007/0017370 A1 | 1/2007 | Clausen et al. | |

OTHER PUBLICATIONS

Written Opinion of International Searching Authority Dated Jul. 28, 2008, International Application No. PCT/US2008/055288.

\* cited by examiner

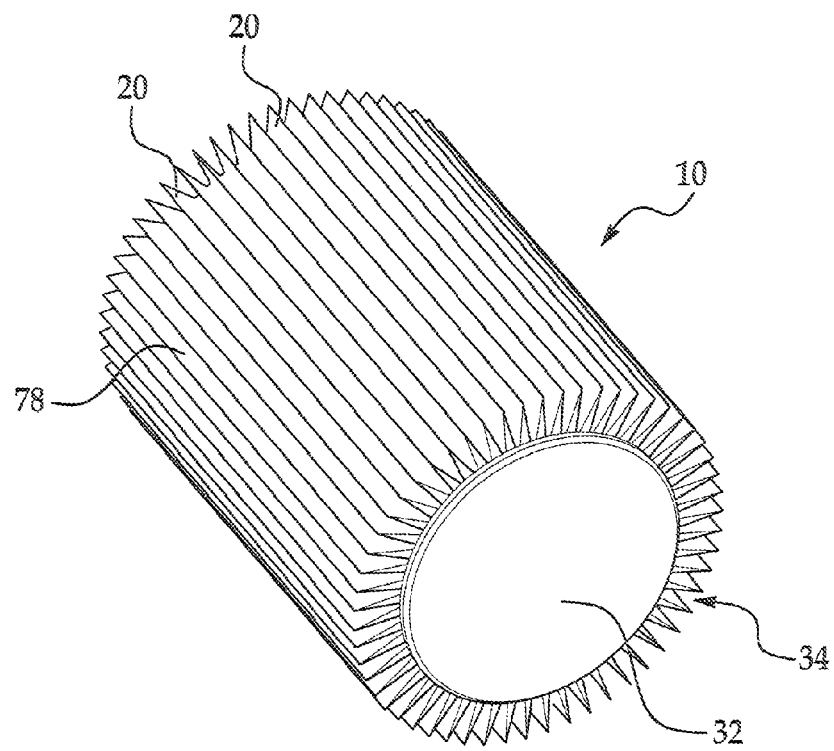
FIG. 8B
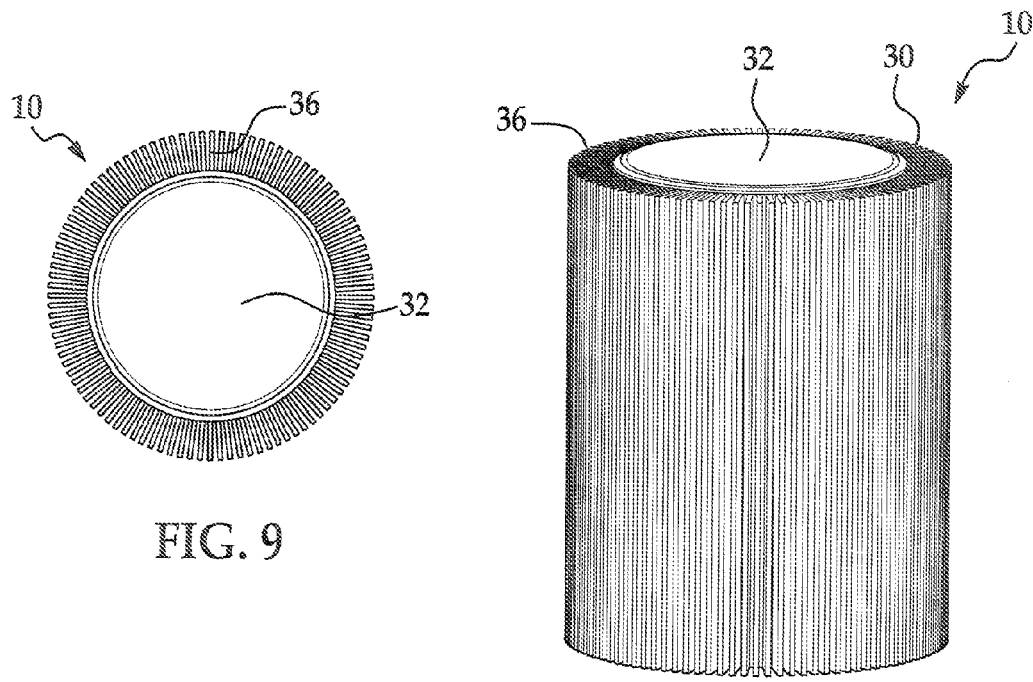
FIG. 9
FIG. 10

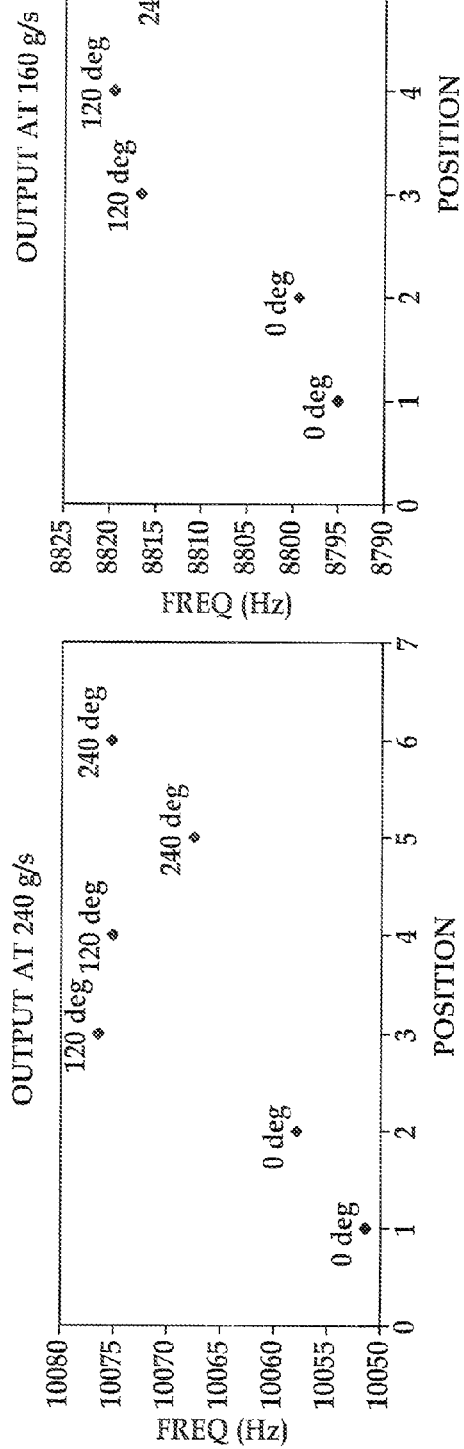
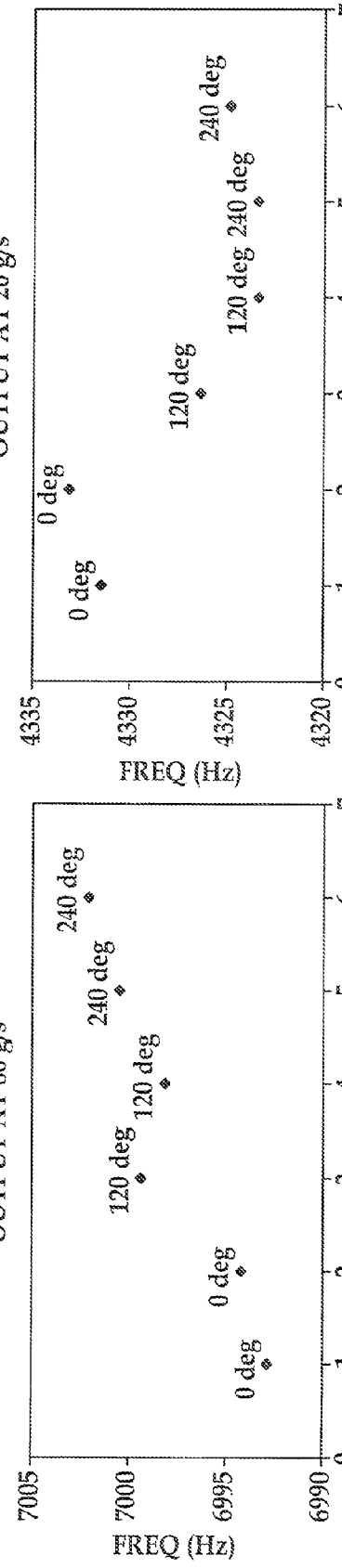

RADIAL SEAL FILTER WITH OPEN END PLEATS

CLAIM OF PRIORITY

This application claims the benefit of U.S. Patent Application Ser. No. 60/892,210, filed Feb. 28, 2007, the contents of which are incorporated herein by reference thereto.

FIELD OF THE INVENTION

Exemplary embodiments of the present invention are directed towards improved fluid filters and methods of making and using the same.

BACKGROUND

Air induction housing systems are continually being challenged to become smaller and unique in shape without loss of system performance. In particular and referring to vehicular applications, this is due in part to the reduction in available real estate in the engine compartment. As vehicle profiles are reduced and engine systems become more complex there is very little available space for the air induction system, which is a critical component of the engine. The air induction system in an internal combustion engine of a vehicle provides at least two important functions; providing a means for delivery of air into the combustion chambers of the engine and providing a means for filtering the air prior to its delivery to the combustion chambers. Due to its filtering function the filter itself needs to be replaced after an extended period of use thus, accessibility to the filter is also a requirement imposed upon the air induction system as well as the housing.

In some designs the air induction system is not designed until the engine design is completed thus, the designers of the air induction system are typically faced with the problem of providing a predetermined amount of airflow to the engine while also being presented with a limited or unique amount of space between the engine and the vehicle hood, front grill, etc. Accordingly, the air induction housing typically has a unique configuration that is optimized for flow and space requirements, which may be contradictory to design requirements for the filter to be located within the air induction system.

Furthermore, reducing the housing size and creating unique shapes limits the overall size of the filter capable of being disposed therein. Accordingly, and based upon conventional airflow technology, smaller filters typically result in less capacity thus, reduced performance.

Accordingly, it is desirable to provide a filter and method of manufacture wherein the filter is capable of providing increased capacity while also accommodating the reduced size and shape limits. Moreover, it is also desirable to provide a filter and method of manufacture wherein the filter is configured for use as an air filter, fluid filter, fuel filter, oil filter, coolant filter, etc.

SUMMARY OF THE INVENTION

The above-described and other features are appreciated and understood by those skilled in the art from the following detailed description, drawings, and appended claims.

In one exemplary embodiment a filter is provided, the filter comprising a filter element comprising pleated filter media having a plurality of pleats configured into a closed loop of filter media, the filter element having an outer perimeter defined by a plurality of outer pleat tips, and an inner perimeter defined by a plurality of inner pleat tips, the plurality of inner pleat tips defining an inner chamber extending through the filter element; a cap disposed on a first end of the filter element the cap being configured to seal a first opening of the first end of the filter; a first plurality of open end pleats positioned between an edge of the cap and the outer perimeter of the filter element, the first plurality of open end pleats defining a first fluid path through the filter media into the inner chamber; a sealing ring disposed on a second end of the filter element the sealing ring being configured to provide an inlet opening providing fluid communication to the inner chamber; and a second plurality of open end pleats positioned between an edge of the sealing ring and the outer perimeter of the filter element, the second plurality of open end pleats defining a second fluid path through the filter media into the inner chamber.

The above features and advantages and other features and advantages of the present invention are readily apparent from the following detailed description of the best modes for carrying out the invention when taken in connection with the accompanying drawings.

DESCRIPTION OF THE DRAWINGS

Other features, advantages and details appear, by way of example only, in the following detailed description of embodiments, the detailed description referring to the drawings in which:

FIGS. 7A-10 are views of filters constructed in accordance with exemplary embodiments of the present invention; and FIGS. 11-23 illustrate test data related to filters constructed in accordance with exemplary embodiments of the present invention.

DETAILED DESCRIPTION OF EXEMPLARY EMBODIMENTS

Figure 1:
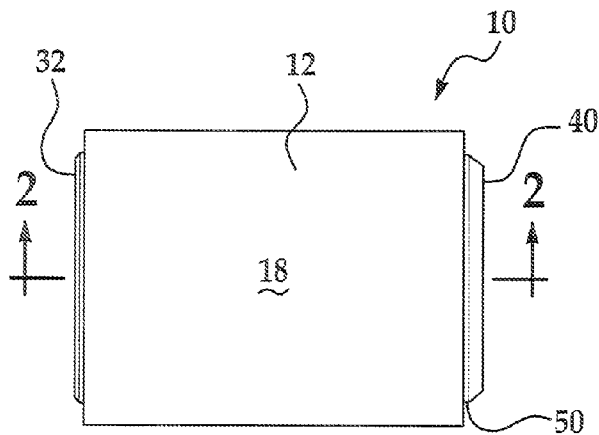
FIG. 1 is a side view of a filter constructed in accordance with an exemplary embodiment of the present invention.
Figure 2:
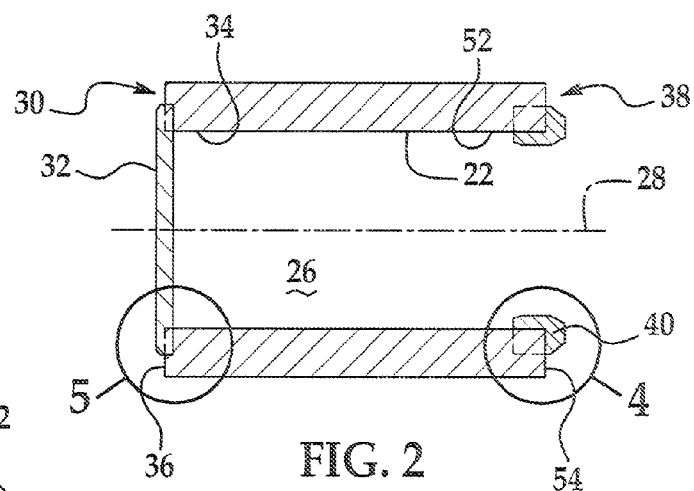
FIG. 2 is a view along lines 2-2 of FIG. 1.
Figure 3:
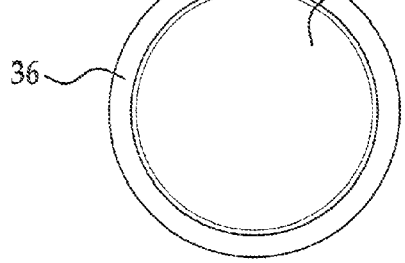
FIG. 3 is an end view of the filter of FIG. 1.
Figure 4:
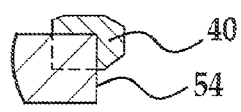
FIG. 4 is an enlarged view of a portion of FIG. 2.
Figure 5:
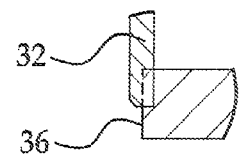
FIG. 5 is an enlarged view of another portion of FIG. 2.
Figure 6:
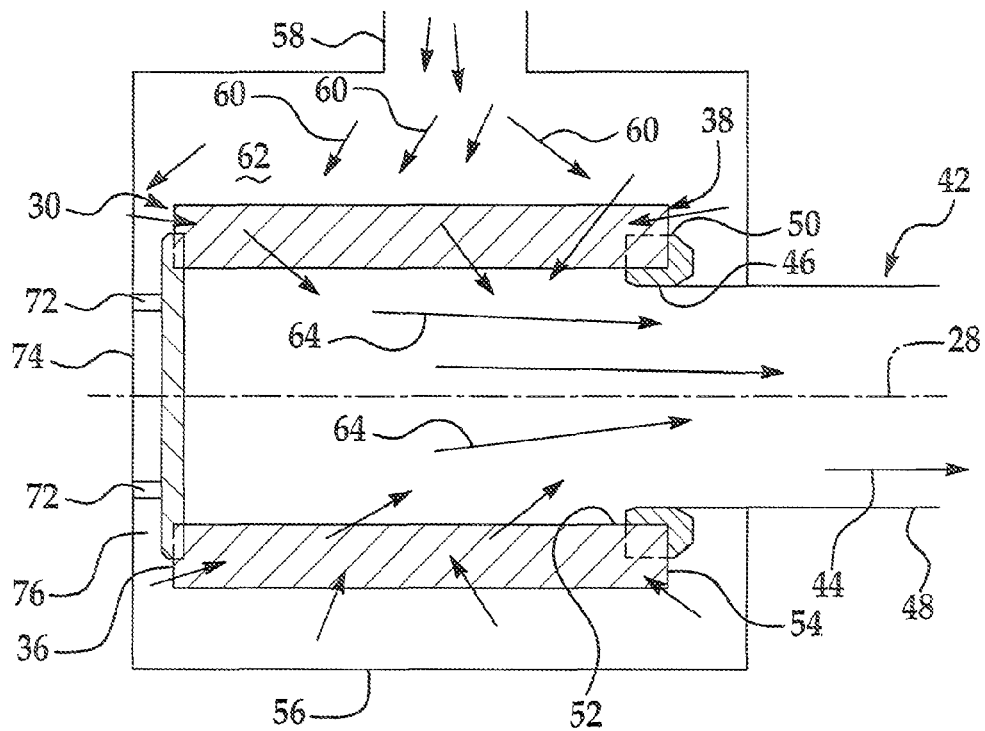
FIG. 6 is a cross sectional view of a filter constructed in accordance with an exemplary embodiment of the present invention inserted within a filter housing.
Figure 7A:
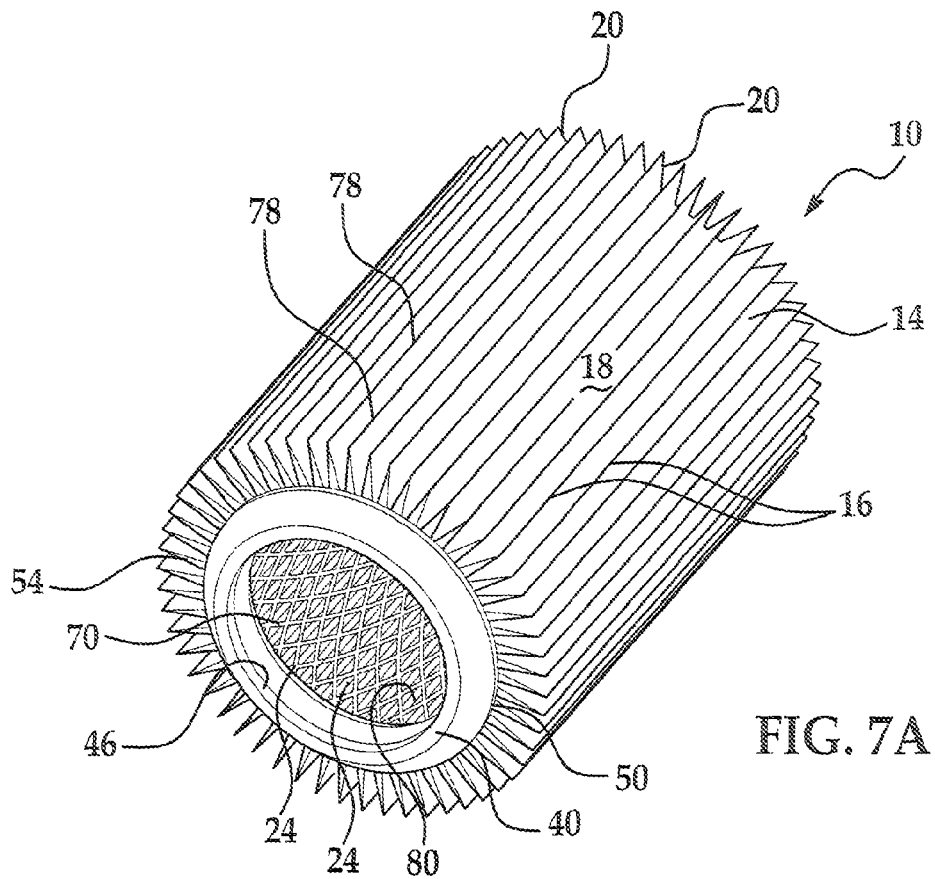
Figure 7B:
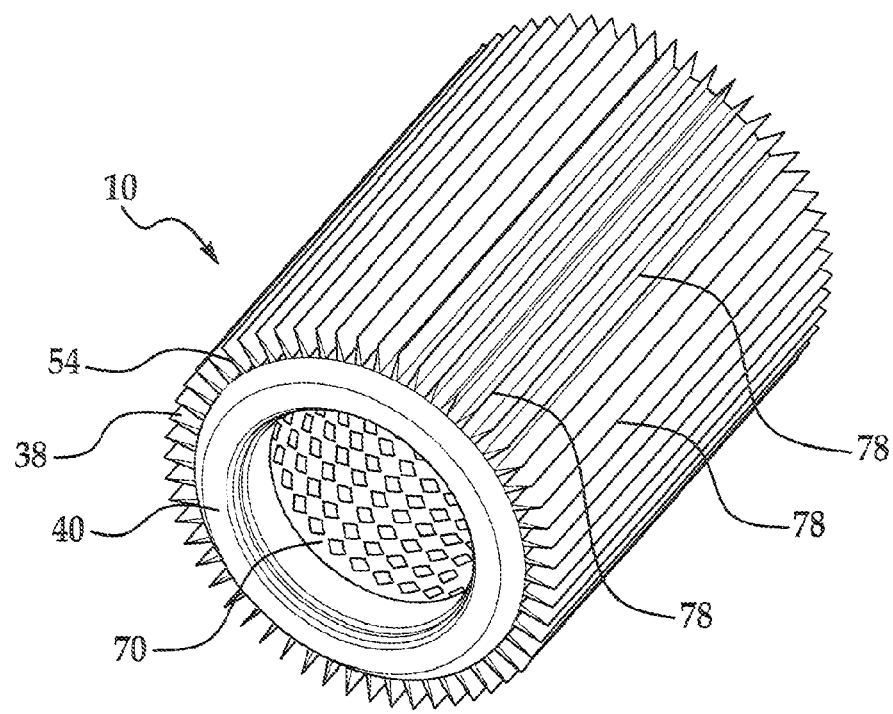
Figure 8A:
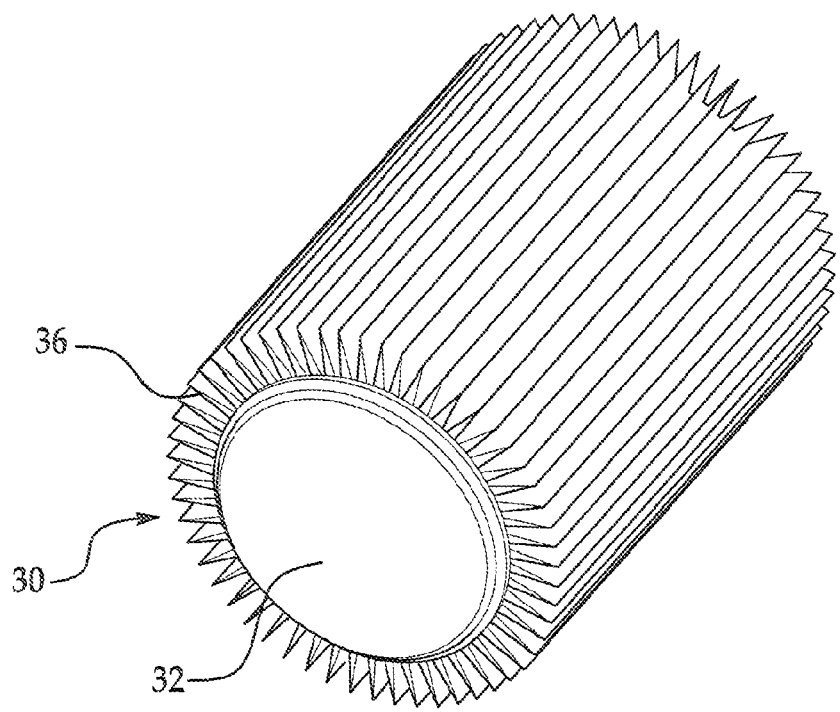
Figure 11:
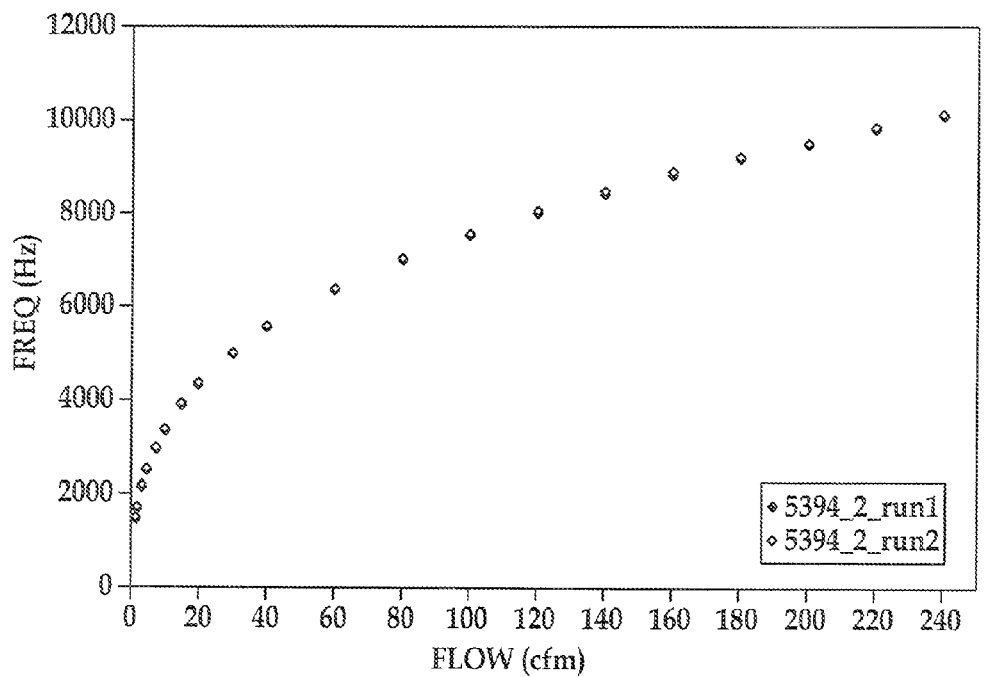
Figure 12:
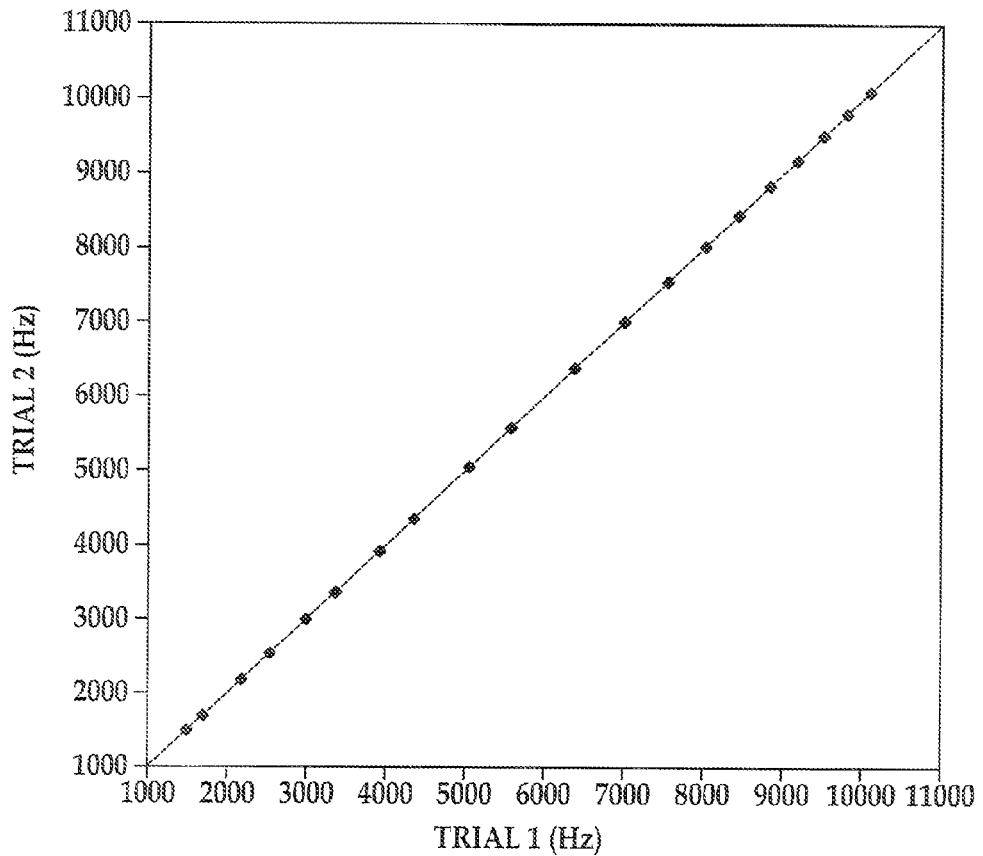
Figure 13:
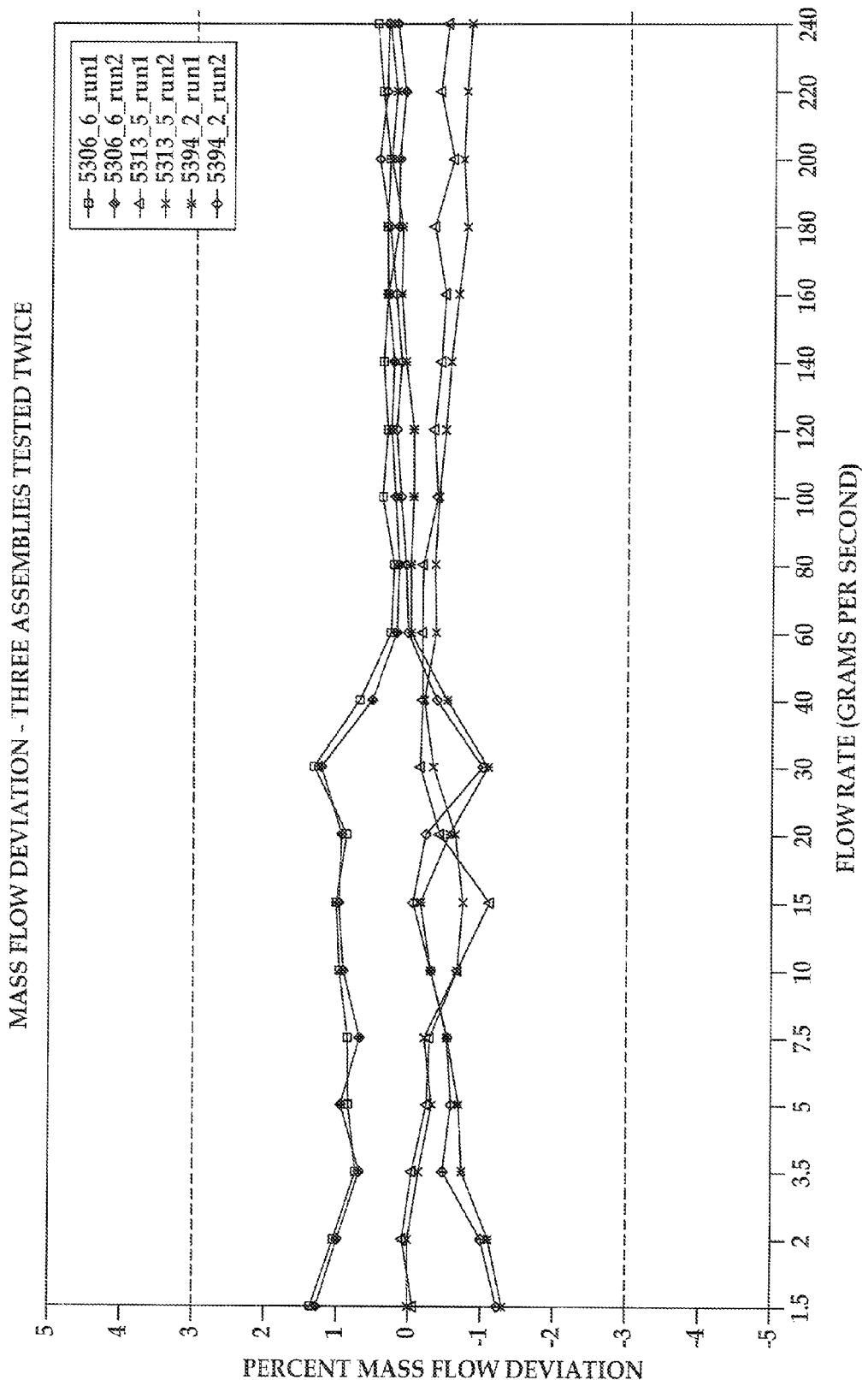
Figure 14:
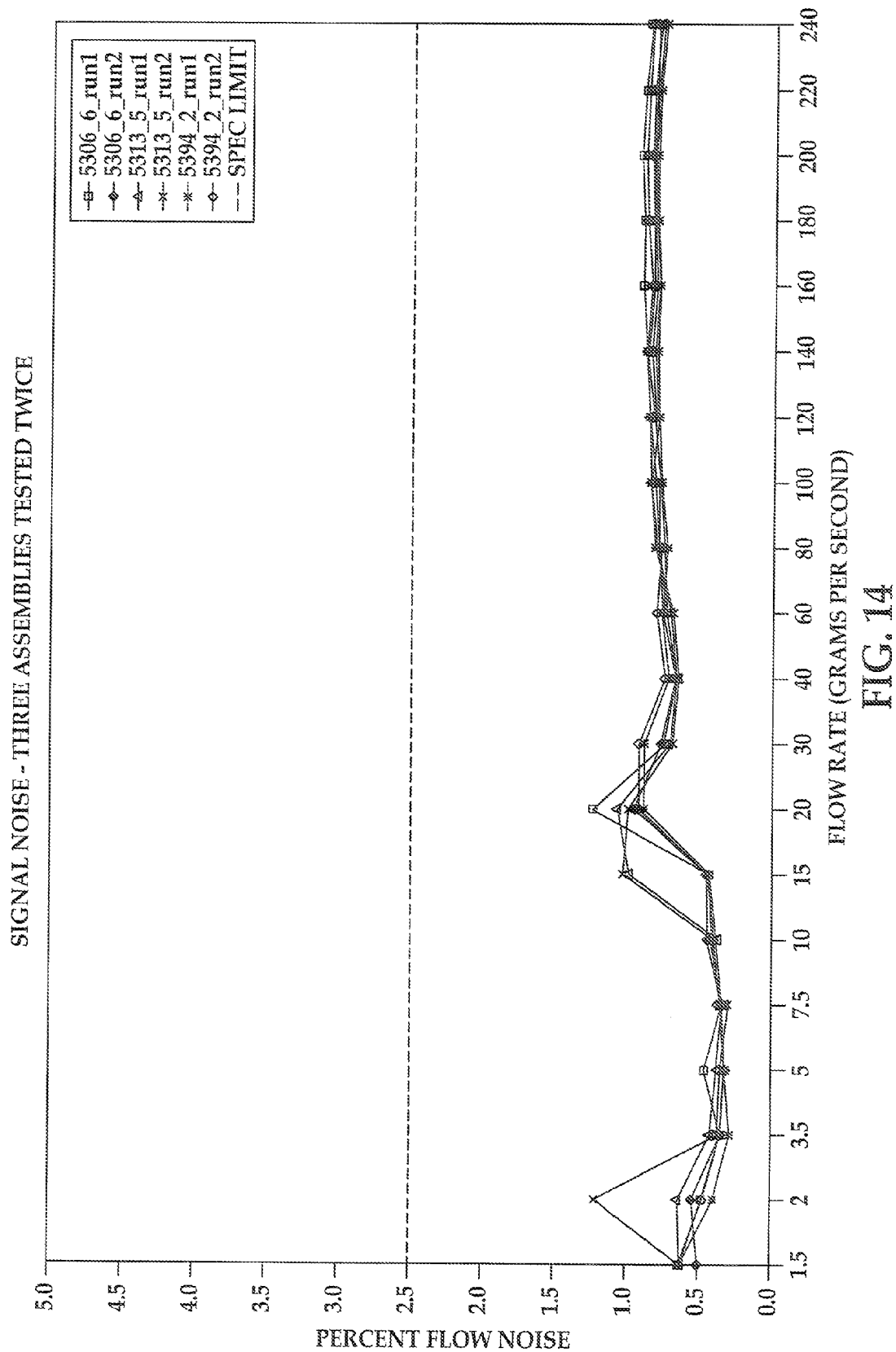
Figure 15:
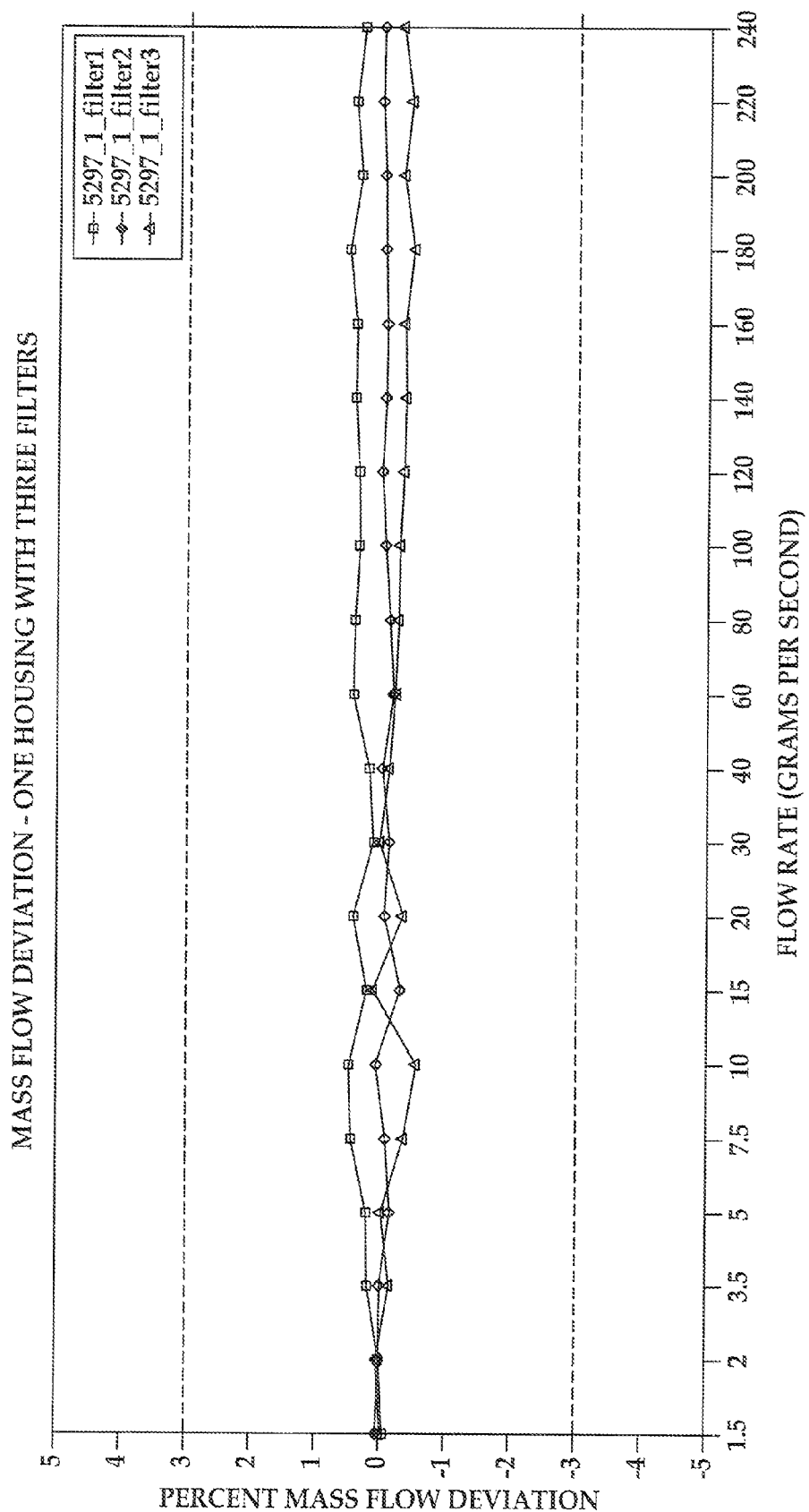
Figure 16:
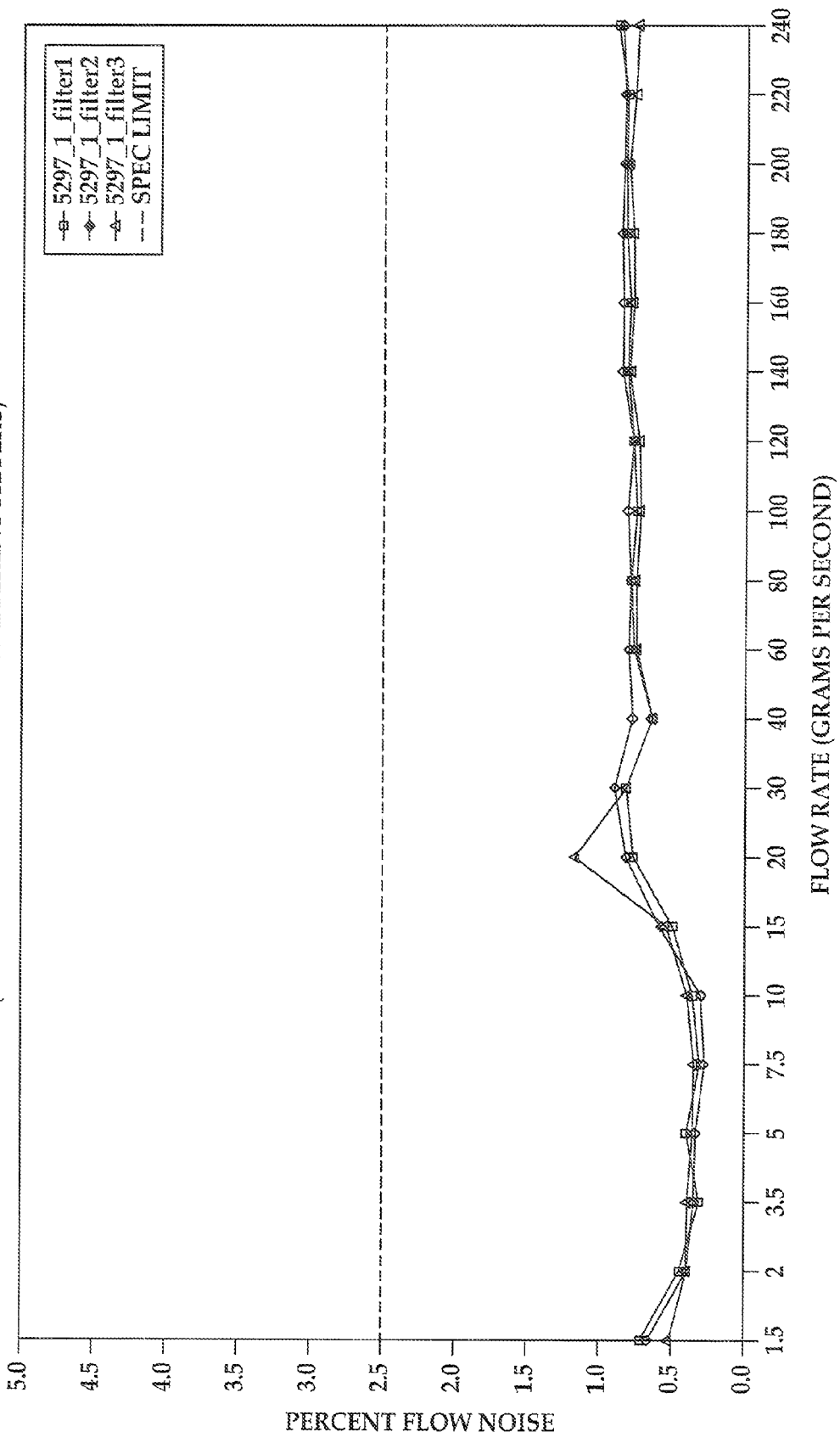
Figure 18:
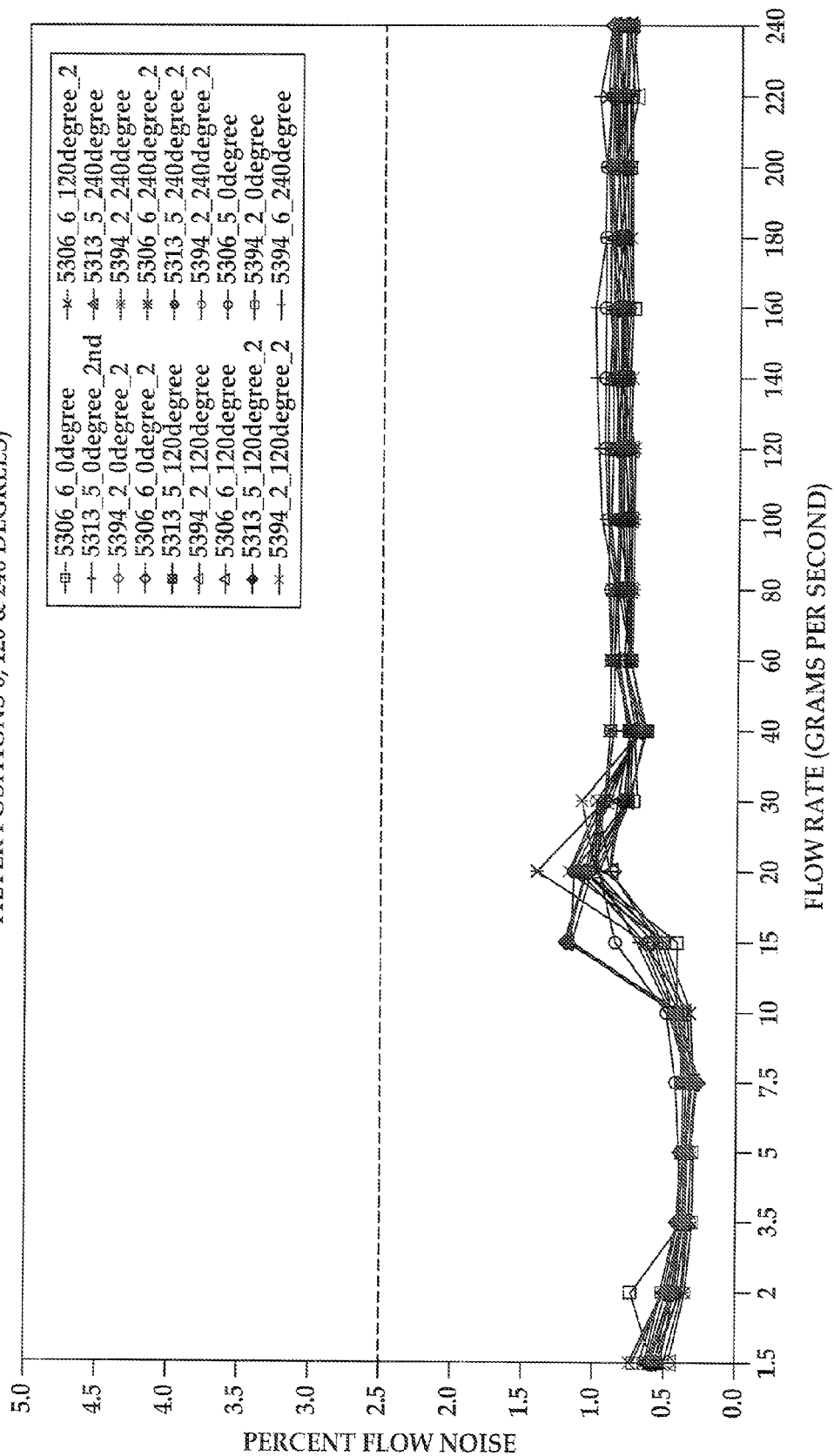
Figure 19:
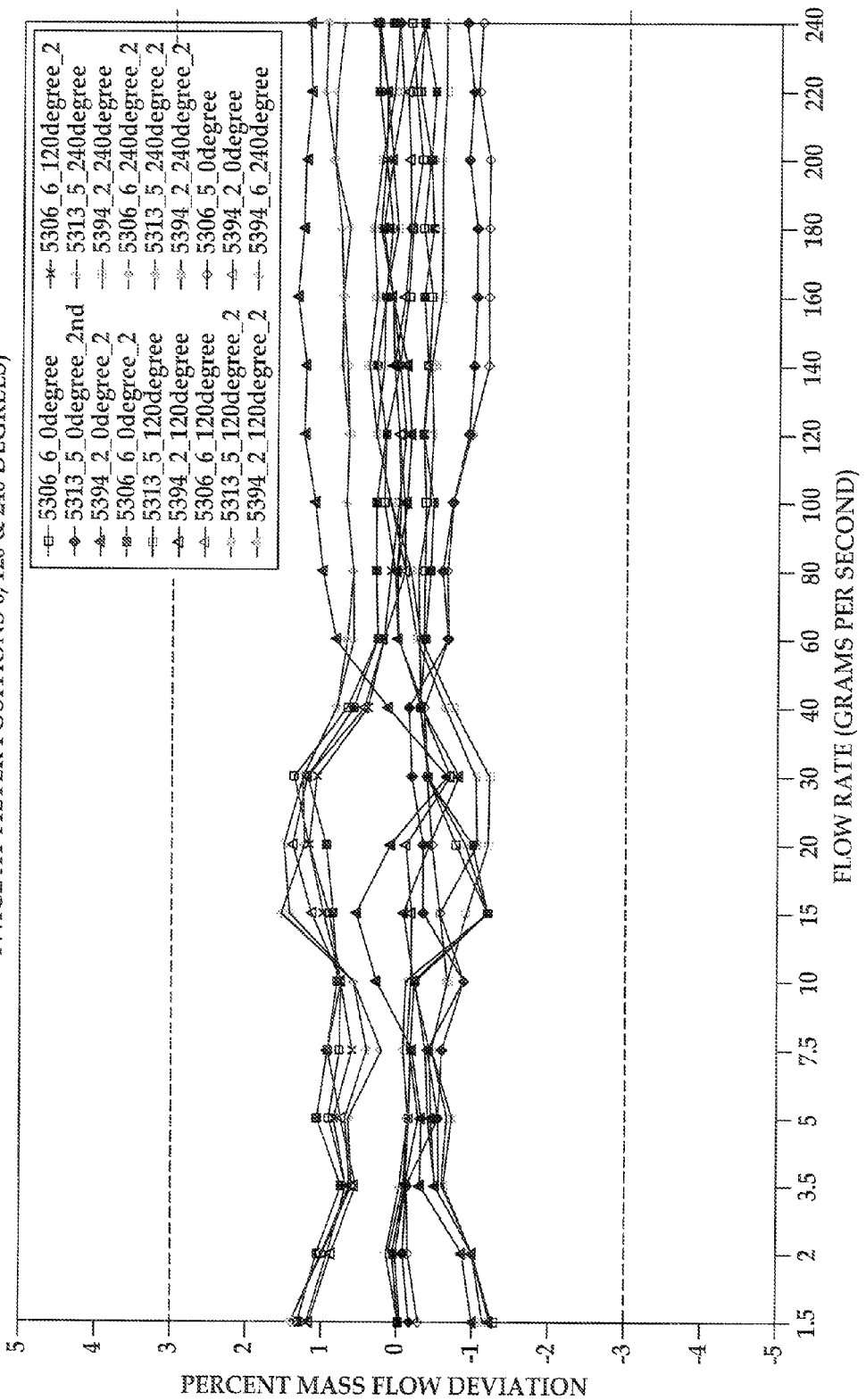
Figure 20:
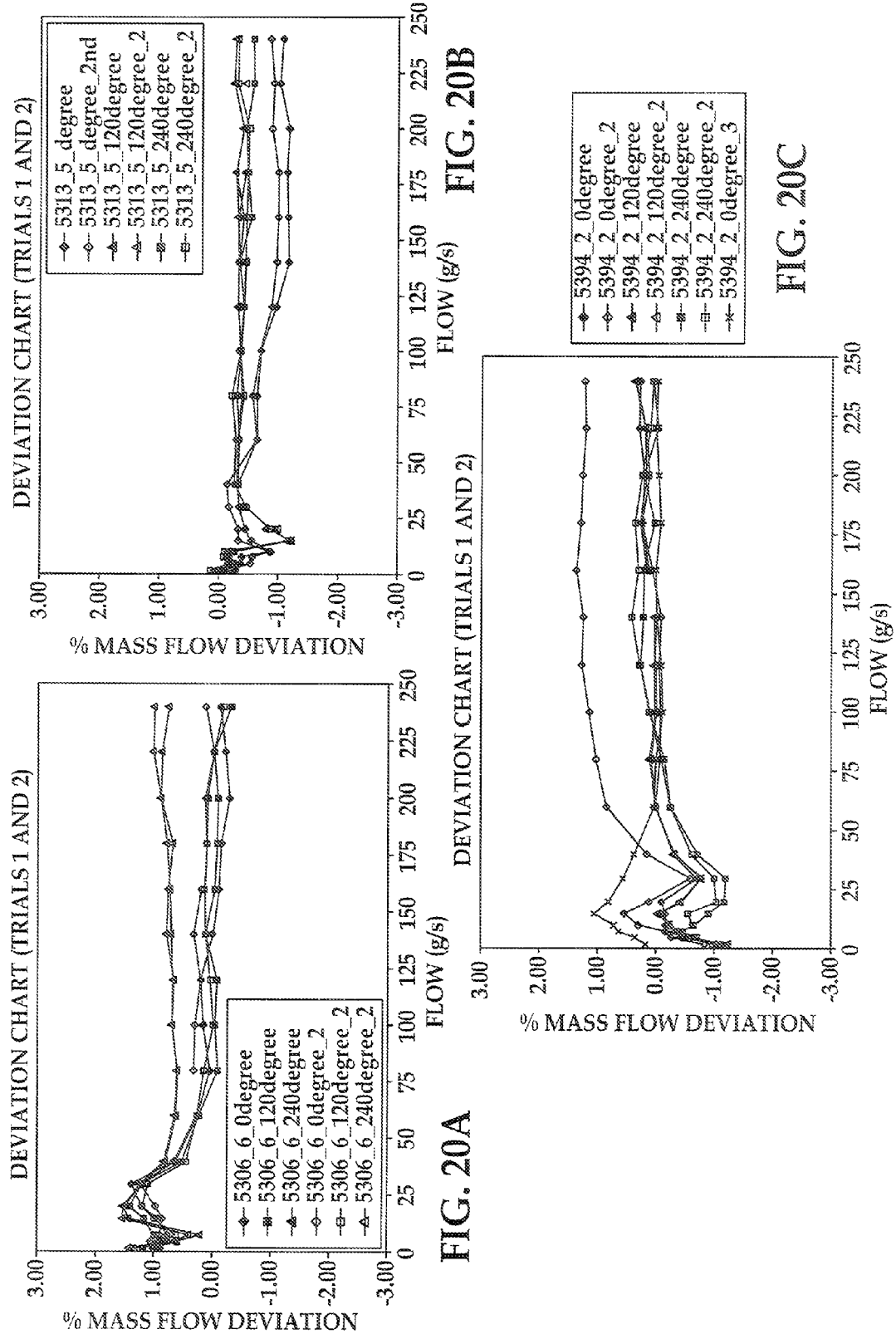
Figure 21:
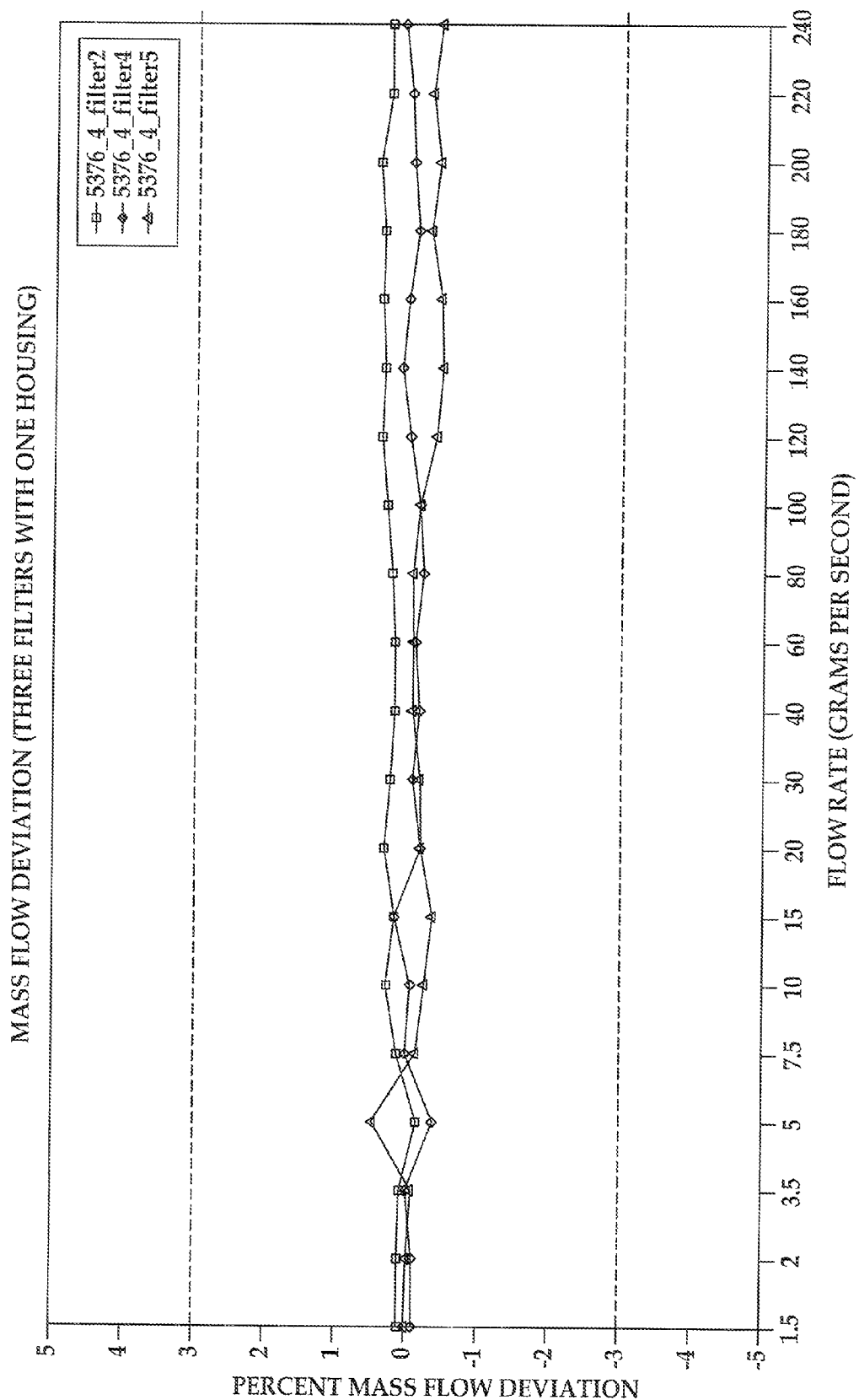
Figure 22:
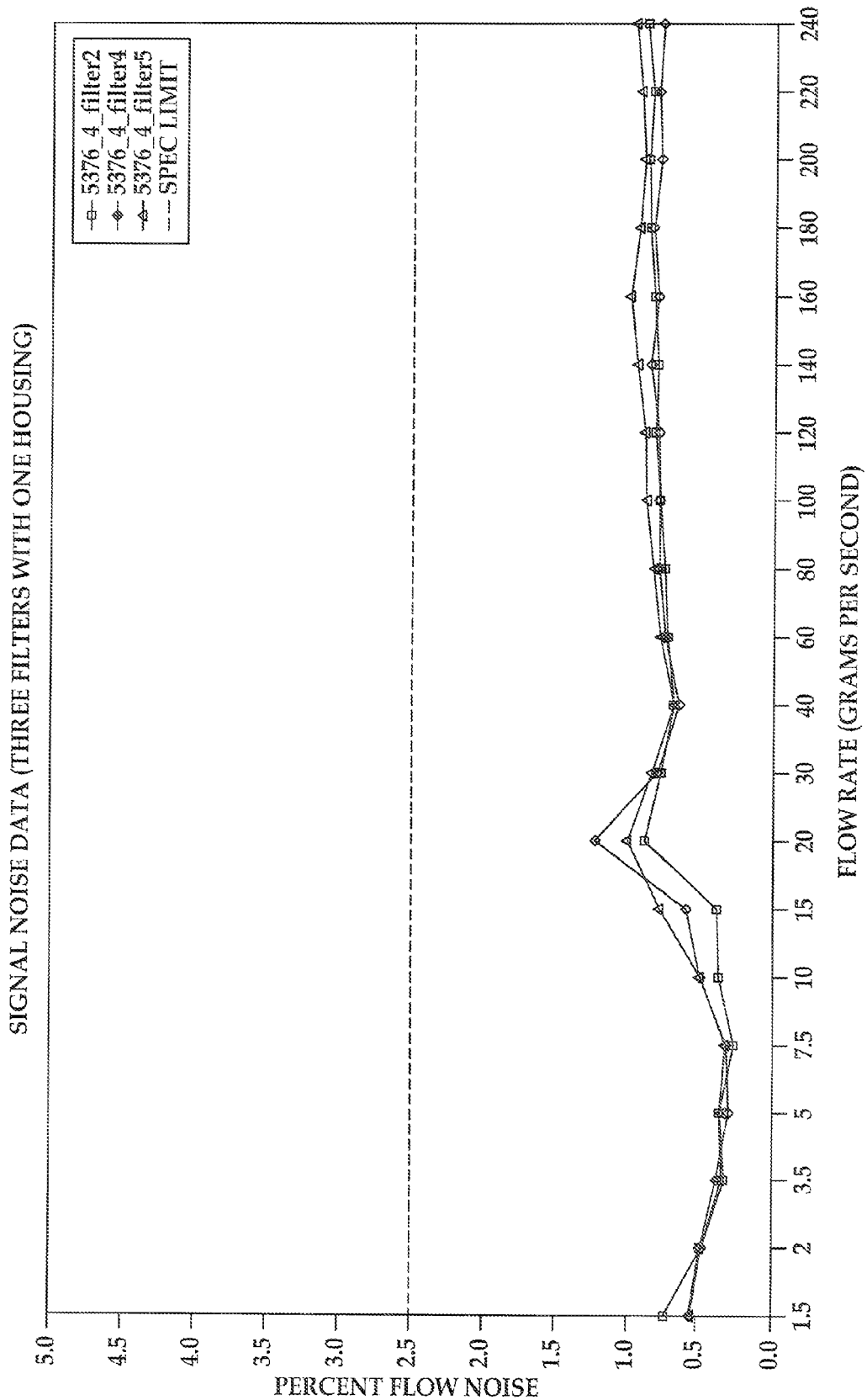
Figure 23:
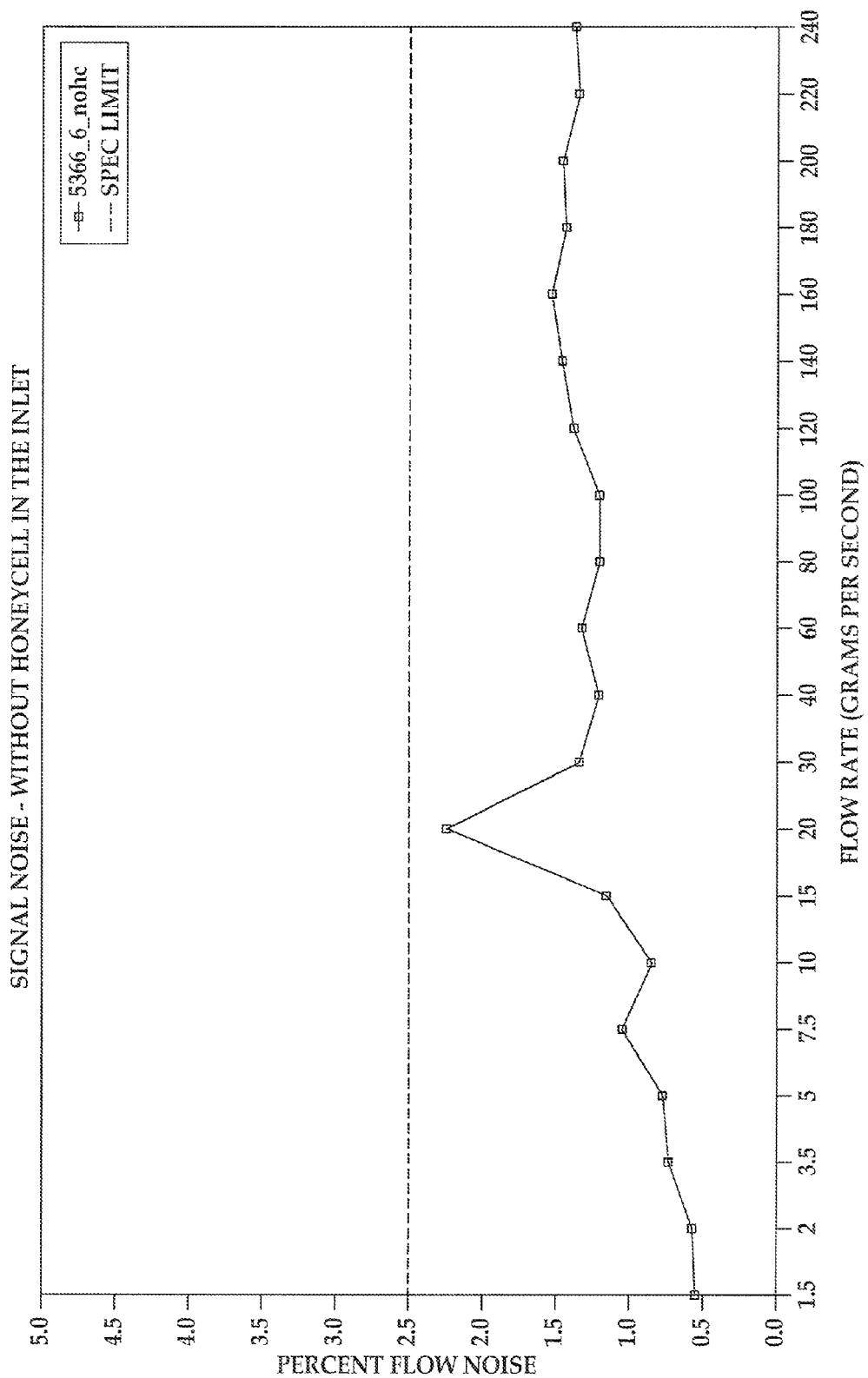

For the purposes of promoting an understanding of the principles of the present invention, reference will now be made to the exemplary embodiments illustrated herein, and specific language will be used to describe the same. It will nevertheless be understood that no limitation of the scope of the invention is thereby intended. Any alterations and further modifications of the described filters, cartridges, and processes, and any further applications of the principles of the invention as described herein, are contemplated as would normally occur to one skilled in the art to which the invention relates.

Exemplary embodiments of the present invention were developed to eliminate sources of part and process variation in air induction systems to enable the production of a more robust filter and using the same to enhance Mass Air Flow Sensor (MAFS) performance. A precise, repeatable MAFS signal is critical to emissions control in modern engines. Filter to filter and within filter deviations and excessive signal noise hinder the repeatability and accuracy of the MAFS signal and prevent the control system from being tuned to a more sensitive level, in turn causing more heavy metals to be used in the catalytic converters and other systems such as secondary air.

In accordance with an exemplary embodiment of the present invention an outer screen of a typical radial seal filter was eliminated, reducing any variation caused positionally or in the welded joint of the screen to the filter element.

In addition, the urethane on the pleat ends of the filter is virtually eliminated, reducing pleat spacing variation caused by the expansion of the urethane as well as uneven pour distribution and flow of the urethane. During the potting process the urethane expansion rate is inherently variable, which also contributes to flow variation. Exemplary embodiments of the present invention also allow higher dirt holding capacity because the urethane is not covering the media around the ends of the filter. Because the amount of urethane at the end of the filter is reduced, smoother airflow paths are now possible.

In addition, various features can be molded into the closed end to enable indexing the filter into the housing, and an indexing feature could be combined with a port for secondary air or PCV vapors. On the open end, the urethane forms a ring on the inner diameter of the filter medium to enable sealing to an air induction duct. Pleat lock on the outer circumference of the media can also be used to stabilize the pleat structure under high flow conditions.

In an alternative exemplary embodiment, a wrap of non-woven synthetic batting could be applied on the outer circumference of the filter to further increase dirt holding capacity.

In accordance with an exemplary embodiment of the present invention the pleat pack of the filter is made by a rotary pleater, with an apparatus for applying a bead of adhesive to both extreme ends of the media along its length as it exits the pleater. Spiral collector rolls then gather the pleats together and hold the glued edges against each other until the glue starts to set.

At this point the pleated and sealed filter media exits the collector rolls and is cut, and then is clipped with either a metal clip or adhesive and then this pleat pack is then placed around an inner screen. This closed loop of media is then placed into a urethane mold for each end of the filter where the urethane is to be molded.

A pleat lock of hotmelt or some other adhesive is applied on the outer circumference of the pleats either before or after the urethane is molded. Both the closed and open end of the filter is sealed with a minimal amount of urethane which covers approximately one quarter of the pleat width. Of course, other amounts (e.g., greater or less than one quarter of the pleat width) may be covered by the urethane. For example, exemplary embodiments of the present invention include the closed and/or open end of the filter having sealant material, such as urethane, covering approximately one tenth, one quarter, one third, one half, two thirds, three quarters, or otherwise, of the pleat width, e.g. material thickness. Also, other exemplary embodiments of the present invention include the closed and/or open end of the filter having sealant material, such as urethane, covering no more than approximately one tenth, one quarter, one third, one half, two thirds, three quarters, or otherwise, of the pleat width, e.g. material thickness.

On the open end, the inside diameter of the urethane forms an o-ring type seal to the outer diameter of the inlet pipe.

FIGS. 1-10 illustrate a filter 10 constructed in accordance with exemplary embodiments of the present invention. Filter 10 has a filter element 12. Filter element 12 is formed by pleating a filter media 14 into a plurality of pleats 16 as discussed above, wherein ends of the pleated filter media are secured together to defined a closed loop or circumference, having an outer perimeter or periphery 18 defined by a plurality of outer pleat tips 20, and an inner perimeter or periphery 22 defined by a plurality of inner pleat tips 24. In one non-limiting exemplary embodiment, the filter media comprises a non-woven material. Non-limiting examples of non-woven media include but are not limited to synthetic and cellulose based non-woven medias.

The filter element defines a hollow interior 26 extending along an axis 28. At a first end 30 of the filter element a cap 32 is molded to cover an opening 34 of filter element 30. In accordance with an exemplary embodiment the cap, is formed from a liquid castable material such as urethane, is potted onto the end of the media and is configured to only cover opening 34 without extending all the way to the outer periphery of the filter element, particularly an outer periphery edge of the cap. In other words cap 32 is slightly larger than opening 34 but smaller than the outer periphery of the filter element. The configuration of the cap is defined by the mold of the cast the filter is inserted into during the potting process. Accordingly, a ring of open end pleats 36 are disposed at end 30 of the filter element.

At an opposite or second end 38 of the filter element a sealing ring 40 is provided in order to provide a means for receiving a conduit tube 42 therein. Tube 42 provides a fluid path 44 out of the filter (e.g., filtered fluid that passes through the media passes through tube 42. In accordance with an exemplary embodiment of the present invention sealing ring 40 is formed out of a compressible resilient material similar to that used to provide cap 32, wherein the same is applied during a potting process.

As shown, the sealing ring has an inner dimension or diameter 46 slightly smaller than an outer dimension or diameter 48 of the conduit tube. In accordance with an exemplary embodiment and in order to provide a means for releaseably sealing the conduit thereto, the sealing ring extends past the inner edge of the filter media defined by inner pleat tips 24, thus a portion of the sealing ring is provided to be compressed when the conduit tube is inserted therein. In addition, an outer diameter, periphery or circumference 50 of sealing ring 40, or an edge of the sealing ring, is slightly larger than an opening 52 at end 38 however, the periphery edge of the sealing ring does not extend to the outer edge of the filter media defined by the outer pleat tips. Accordingly, a ring 54 of open end pleats are positioned at end 38. In accordance with an exemplary embodiment the open end pleats and cap 32 and sealing ring 40 are configured so that fluid must pass through the media in order to pass into the hollow interior, which is in fluid communication with the outlet tube.

In accordance with an exemplary embodiment, the filter is disposed in a housing 56 a non-limiting configuration of which is generally shown in FIG. 1. The housing is configured to have a fluid inlet 58 wherein fluid flow is illustrated by arrows 60. Of course, the fluid inlet may be at other locations than those shown in the Figures. The fluid inlet 50 admits inlet fluid, such as air or liquid, radially and/or tangentially into a space 62 within the housing around the filter. Accordingly and as illustrated by the arrows in FIG. 1 fluid flowing into the housing is filtered by the filter by passing through the media at the outer circumference and at the open end pleats located at either ends of the filter. Thereafter, filtered fluid flows out of the filter in the direction of arrows 64 and through the outlet conduit.

Accordingly, filter 10 provides less flow restriction than a filter having both ends or at least one end completely sealed by an end cap and sealing ring. Moreover, the design will provide a more uniform flow through the air filter housing since there is more flow capacity and accordingly the filter of exemplary embodiments of the present invention is less likely to disrupt the fluid flow there through to cause a mass air flow sensor disposed in the housing to provide a signal to an engine control module indicating that the fluid flow in a vehicle air induction system is outside of the tolerances set by the mass air flow sensor. In addition, this allows the mass air flow sensor to be set at a more sensitive setting providing improved emission control.

In one non-limiting exemplary embodiment, an inner liner 70 is disposed on the inner pleat tips. Alternatively, the filter may be constructed without inner liner 70. In one embodiment the inner liner is provided by an expanded wire mesh or screen or perforated metal.

In another non-limiting exemplary embodiment, the cap is configured to have one or more or a plurality of protrusions 72 that depend away from a surface of the cap and are compressed between and against a section 74 of the housing. Protrusions 72 are of a sufficient length to create a gap 76 between cap 32 and end 30 so that fluid can flow into the open end pleats of end 30. Protrusions 72 may be integrally formed with the cap to provide means with the filter for forming the gap between the filter and the housing of the filter, during installation or otherwise, to maintain fluid flow through the open end pleats. Protrusions 72 may also be used as locating features for locating the filter in the housing. For example, the features can be configured to be received within complimentary openings in the housing thus assisting in the alignment of the filter when it is inserted into the housing.

Alternatively, the filter is constructed without the protrusions and the filter is maintained in a spaced relationship with respect to the walls of the housing by support from the outlet tube. Moreover and depending on the housing configuration and inlet fluid flow end 30 may be disposed at other locations with respect to the fluid inlet flow.

In accordance with one exemplary embodiment the pleats of the filter element have pairs of walls defining axially extending exterior channels 78 and axially extending interior channels 80. The walls of the pleats defining the interior channels are sealed to each other at either end of the filter element by for example heat seal bonding along glue strips or other equivalent means for sealing the pleats together. This prevents bypass of dirty fluid (e.g., air or liquid) around the ends of the pleats at open end channels. In other words the fluid must pass through the media at the ends of the filter.

As discussed above the cap and sealing ring are applied to the filter element by a molding potting process, wherein liquid castable material into which the pleated filter media is dipped will foam up a short distance axially into the channels between the pleats while the ends of the inner channels not covered by the foam are sealed by for example using an adhesive such as glue.

Exemplary embodiment of the present invention may be configured as an air filter or the filter may also be used for other fluids such as liquids (e.g., fuels, oils, coolants, etc.).

In accordance with exemplary embodiments of the present invention the open ended pleats are provided on either side of the filter wherein the same are sealed using a hot melt edge seal, to improve flow characteristics of the filter. Exemplary embodiment of the present invention require a minimum poly-urethane application, reducing pleat distortion wherein in one non-limiting exemplary embodiment, the urethane is used to ensure a housing seal only.

In addition, the filter of exemplary embodiments of the present invention eliminates the outer screen to reduce flow variability (e.g., screen overlap) and eliminate safety concerns. Also, the requirement for a filter clip is also eliminated thus reducing flow variability.

FIGS. 11-23 illustrate data generated with various filter constructed in accordance with exemplary embodiment of the present invention wherein the various filter are tested in multiple housings.

This design also could incorporate an indexing element to provide further control of filter placement to align it relative to the housing.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of forming a filter, comprising:
   forming a filter element with a pleated filter media having a plurality of pleats into a closed loop to define an inner chamber, the filter element having an outer perimeter defined by a plurality of outer pleat tips and an inner perimeter defined by a plurality of inner pleat tips;
   molding a compressible urethane cap on a first end of the filter element to completely cover an opening of the inner chamber, the opening being defined by the inner perimeter and the compressible urethane cap including an outer edge located between the inner perimeter and the outer perimeter of the filter element, where a first plurality of open end pleats are located between the outer edge of the cap and the outer perimeter of the filter element, the first plurality of open end pleats defining a first fluid path through the filter media into the inner chamber;
   molding a compressible urethane ring on a second end of the filter element to form an inlet opening for providing fluid communication with the inner chamber, the compressible urethane ring having an outer edge located between the inner perimeter and the outer perimeter of the filter element to form a second plurality of open end pleats, the second plurality of open end pleats being located between the outer perimeter of the filter element and the compressible urethane ring, wherein the second plurality of open end pleats define a second fluid path through the filter media into the inner chamber;
   providing at least one protrusion integrally formed with and extending away from a surface of the cap for aligning the filter in a housing; and
   inserting the at least one protrusion into a complimentary opening in the housing to assist in the alignment of the filter in the housing.

2. The method as in claim 1, wherein the filter is an air filter.

3. The method as in claim 1, wherein the plurality of pleats each have pairs of walls defining axially extending exterior channels and axially extending interior channels and the walls of the pleats defining the interior channels are sealed between the edge of the cap and the outer perimeter of the filter element and sealed between the outer edge of the urethane ring and the outer perimeter of the filter element.

4. The method as in claim 3, wherein the pairs of walls defining the axially extending interior channels are sealed with an adhesive.

5. The method as in claim 1, wherein the cap covers substantially no more than approximately one half of a material thickness of the filter element.

6. The method as in claim 1, wherein the cap covers approximately one quarter of the material thickness of the filter element.

7. The method as in claim 1, wherein the urethane ring covers substantially no more than approximately one half of a material thickness of the filter element.

8. The method as in claim 1, wherein the urethane ring covers no more than approximately one quarter of the material thickness of the filter element.

9. A method of forming a filter, comprising:
   forming a filter element with a pleated filter media having a plurality of pleats into a closed loop to define an inner chamber, the filter element having an outer perimeter defined by a plurality of outer pleat tips and an inner perimeter defined by a plurality of inner pleat tips;
   molding a compressible cap on a first end of the filter element to completely cover an opening of the inner chamber, the opening being defined by the inner perimeter;
   molding a compressible sealing ring on a second end of the filter element to form an inlet opening for providing fluid communication with the inner chamber,
   providing at least one protrusion integrally formed with and extending away from a surface of the cap for aligning the filter in a housing; and
   inserting the at least one protrusion into a complimentary opening in the housing to assist in the alignment of the filter in the housing.

10. The method as in claim 9, wherein the filter is an air filter.

11. The method as in claim 9, wherein the plurality of pleats each have pairs of walls defining axially extending exterior channels and axially extending interior channels and the walls of the pleats defining the interior channels are sealed between the edge of the cap and the outer perimeter of the filter element and sealed between the edge of the sealing ring and the outer perimeter of the filter element.

12. The method as in claim 11, wherein the pairs of walls defining the axially extending interior channels are sealed with an adhesive.

13. The method as in claim 9, wherein the cap covers substantially no more than approximately one half of a material thickness of the filter element.

14. The method as in claim 9, wherein the cap covers approximately one quarter of the material thickness of the filter element.

15. The method as in claim 9, wherein the sealing ring covers substantially no more than approximately one half of a material thickness of the filter element.

16. The method as in claim 9, wherein the sealing ring covers no more than approximately one quarter of the material thickness of the filter element.

\* \* \* \* \*